United States Patent [19]
Yoshida et al.

[11] Patent Number: 5,093,919
[45] Date of Patent: Mar. 3, 1992

[54] DATA FLOW TYPE INFORMATION PROCESSOR WITH PLURAL OUTPUT PROGRAM STORING APPARATUS

[75] Inventors: Shinichi Yoshida, Kashihara; Souichi Miyata, Nara, both of Japan

[73] Assignee: Sharp Kabushiki Kaisha, Osaka, Japan

[21] Appl. No.: 260,045

[22] Filed: Oct. 20, 1988

[30] Foreign Application Priority Data

Oct. 20, 1987 [JP] Japan .................. 62-265743

[51] Int. Cl.⁵ ............................................. G06F 9/38
[52] U.S. Cl. ..................... 395/800; 364/DIG. 1;
364/232.22; 364/211.8; 364/259; 364/261;
364/263; 364/931; 364/931.01; 364/931.11;
364/938; 364/938.4; 364/942.8; 364/946.2;
364/946.8; 364/950; 364/950.3
[58] Field of Search ... 364/200 MS File, 900 MS File

[56] References Cited

U.S. PATENT DOCUMENTS

| | | | |
|---|---|---|---|
| 4,145,733 | 3/1979 | Misunas et al. | 364/200 |
| 4,153,932 | 5/1979 | Dennis et al. | 364/200 |
| 4,156,903 | 5/1979 | Barton et al. | 364/200 |
| 4,591,979 | 5/1986 | Iwashita | 364/200 |
| 4,675,806 | 6/1987 | Uchida | 364/200 |
| 4,841,436 | 6/1989 | Asano et al. | 364/200 |
| 4,918,644 | 4/1990 | Terada et al. | 364/900 |
| 4,943,916 | 7/1990 | Asano et al. | 364/200 |
| 4,953,082 | 8/1990 | Nomura et al. | 364/200 |
| 4,953,083 | 8/1990 | Takata et al. | 364/200 |

OTHER PUBLICATIONS

Watson et al., "A Practical Data Flow Computer", *Computer*, Feb. 1982, pp. 51-57.
Srini, Vason P., "An Architectural Comparison of Dataflow Systems", *Computer*, Mar. 1986, pp. 68-88.
VLSI Technology Inc., "1,024 × 8 Dual Port Random Access Memory," Sep. 1985.

*Primary Examiner*—Stuart N. Hecker
*Assistant Examiner*—Rebecca L. Rudolph

[57] ABSTRACT

A program storing portion in a data flow type information processor has one input port and two output ports. The two output ports are coupled to a paired data detecting portion through two transmission paths. A program storing portion has a copy function of generating a copy data packet from an original data packet. The original data packet is outputted to the paired data detecting portion through one of the transmission paths from one of the output ports. The copy data packet is outputted to the paired data detecting portion through the other transmission path from the other output port.

5 Claims, 7 Drawing Sheets

DATA FLOW TYPE INFORMATION PROCESSOR WITH PLURAL OUTPUT PROGRAM STORING APPARATUS

BACKGROUND OF THE INVENTION

1. Field of the Invention

The present invention relates generally to information processors, and more particularly, to a data flow type information processor executing a data flow program including instructions to perform a numerical operation processing or logical operation processing with respect to two data.

2. Description of the Prior Art

In a conventional von Neumenn computer, various instructions are stored in advance as programs in a program memory, and addresses in the program memory are sequentially specified by a program counter so that the instructions are sequentially read out, whereby the instructions are executed.

On the other hand, a data flow type information processor is one type of a non-von Neumann computer having no concept of sequential execution of instructions by a program counter. Such a data flow type information processor employs architecture based on parallel processing of instructions. In the data flow type information processor, immediately after data which are objects of an operation are collected, an instruction can be executed, and a plurality of instructions are simultaneously driven by the data, so that programs are executed in parallel in accordance with the natural flow of the data. As a result, it is considered that the time required for the operation is significantly reduced.

Figure 1:
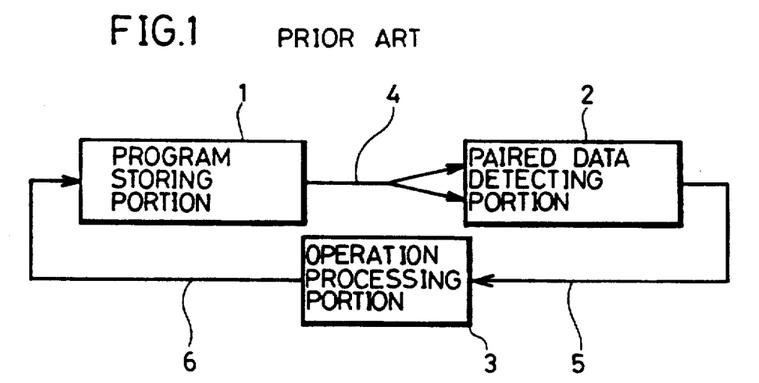
FIG. 1 is a block diagram showing one example of a structure of a conventional data flow type information processor.
Figure 2:
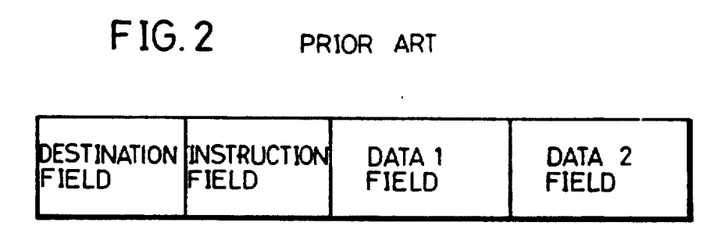
FIG. 2 is a diagram showing a field structure of a data packet processed in the data flow type information processor.

FIG. 1 is a block diagram showing one example of a structure of a conventional data flow type information processor, and FIG. 2 is a diagram showing one example of a field structure of a data packet processed by the information processor.

The data packet shown in FIG. 2 comprises a destination field, an instruction field, a data 1 field, and a data 2 field. The destination field stores destination information, the instruction field stores instruction information, and the data 1 field or the data 2 field stores operand data.

Figure 3:
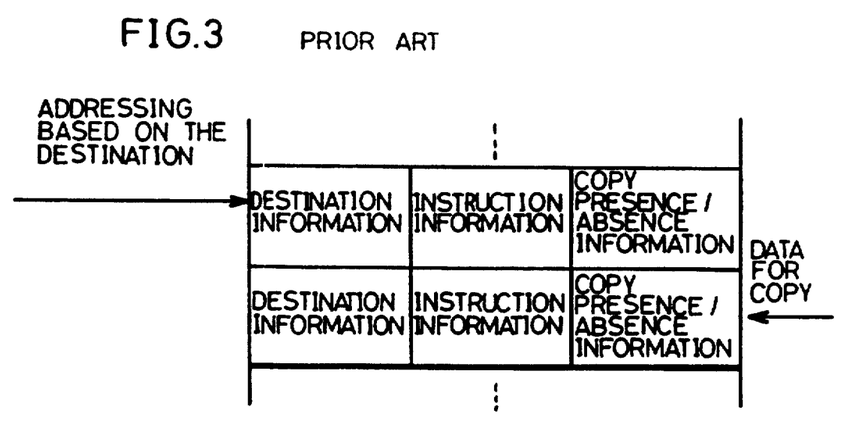
FIG. 3 is a diagram showing a part of a data flow program stored in a program storing portion in the data flow type information processor.

The information processor shown in FIG. 1 comprises a program storing portion 1, a paired data detecting portion 2, and an operation processing portion 3. The program storing portion 1 stores a data flow program shown in FIG. 3. The program storing portion 1 reads out destination information, instruction information and copy presence/absence information in the data flow program, as shown in FIG. 3, by addressing based on the destination information in the inputted data packet, stores a destination information and the instruction information in the destination field and the instruction field in the data packet, respectively, and outputs the data packet. The paired data detecting portion 2 queues the data packet outputted from the program storing portion 1. More specifically, the paired data detecting portion 2 detects the different two data packets having the same destination information, stores operand data in one of the data packets, for example, the content of the data 1 field shown in FIG. 2 in the data 2 field in the other data packet, and outputs the other data packet. The operation processing portion 3 performs operation processing based on the instruction information with respect to the data packet outputted from the paired data detecting portion 2, stores the result of the operation processing in the data 1 field in the data packet, and outputs the data packet to the program storing portion 1.

Meanwhile, the program storing portion 1 and the paired data detecting portion 2 are coupled to each other by a data transmission path 4. The data transmission path 4 is branched into two, to be coupled to two input ports of the paired data detecting portion 2. The data packet outputted from the program storing portion 1 is selectively inputted to either one of the input ports of the paired data detecting portion 2 depending on whether the operand data is right operand data or left operand data in the operation processing. In addition, the paired data detecting portion 2 and the operation processing portion 3 are coupled to each other by a transmission path 5, and the operation processing portion 3 and the program storing portion 1 are coupled to each other by a transmission path 6.

The data packet circulates through the program storing portion 1, the paired data detecting portion 2, and the operation processing portion 3 in that order, so that operation processing based on the data flow program stored in the program storing portion 1 progresses.

Figure 4:
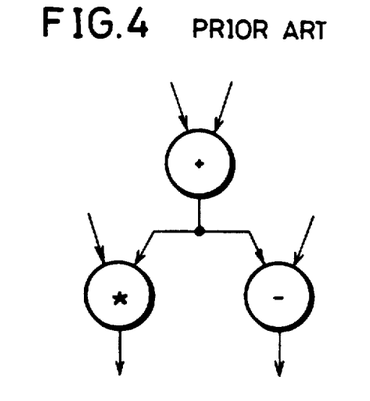
FIG. 4 is a diagram showing one example of a data flow program including copy processing.

Consider a case in which a copy of data is required as shown in FIG. 4, in the data flow program to be executed. More specifically, if and when the result of a given operation, for example, an output of addition instruction shown in FIG. 4 is referenced by two or more operations, instruction other than the addition instruction, for example, a multiplication instruction and a subtraction instruction shown in FIG. 4, copy processing is performed in the program storing portion 1. As shown in FIG. 3, the copy presence/absence information is stored in the program storing portion 1.

First, the content of a portion as addressed is read out from the data flow program based on the destination information of the inputted data packet. On this occasion, if the copy presence/absence information is copy absence information, a data packet is outputted in which the contents of a destination field and an instruction field are updated, so that processing is terminated. On the other hand, if the copy presence/absence information is copy presence information, the data packet is outputted in which the contents of the destination field and the instruction field are updated, and destination information, instruction information and copy presence/absence information as subsequently stored are read out. If the copy presence/absence information as subsequently read out is copy absence information, the same data as the inputted data packet is stored in the data 1 field, and a data packet is outputted in which destination information and instruction information as presently read out are stored in the destination field and the instruction field, respectively, so that processing is terminated. If the copy presence/absence information as subsequently read out is copy presence information, the same copy processing continues to be performed.

Figure 5:
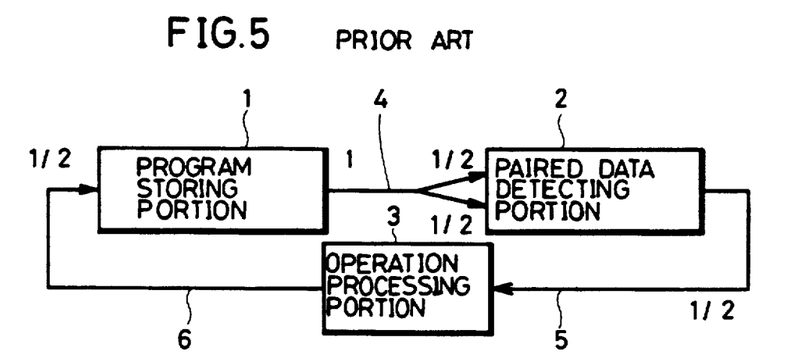
FIG. 5 is a diagram showing the flow rate of a data packet in each transmission path in the information processor shown in FIG. 1.

In the above described information processor, if copy processing is performed once, the ratio of flow rates of data packets in the transmission path 6 for input to the program storing portion 1 and the transmission path 4 for output from the program storing portion 1 becomes necessarily 1:2. The ratio of flow rates of data packets is a ratio of the numbers of the data packets respectively passing through the transmission paths per limit time. FIG. 5 shows the flow rate of a data packet in each transmission path, in which it is assumed that the flow rate of the data packet in the transmission path 4 is 1. The paired data detecting portion 2 outputs a single data packet corresponding to inputs of two data packets. Therefore, even if it is assumed that the transmission path 4 is operated with the best performance, only a flow rate of one half of the maximum performance is ensured in the transmission path 5 and the subsequent transmission paths.

Thus, when copy processing is performed in the program storing portion 1, the transmission paths 5 and 6 are operated with only half of maximum performance. Therefore, the operation processing portion 3 can also display only the capability of one half of the potential capability. As a result, the performance is degraded at the time of program execution in the above described information processor.

Figure 6:
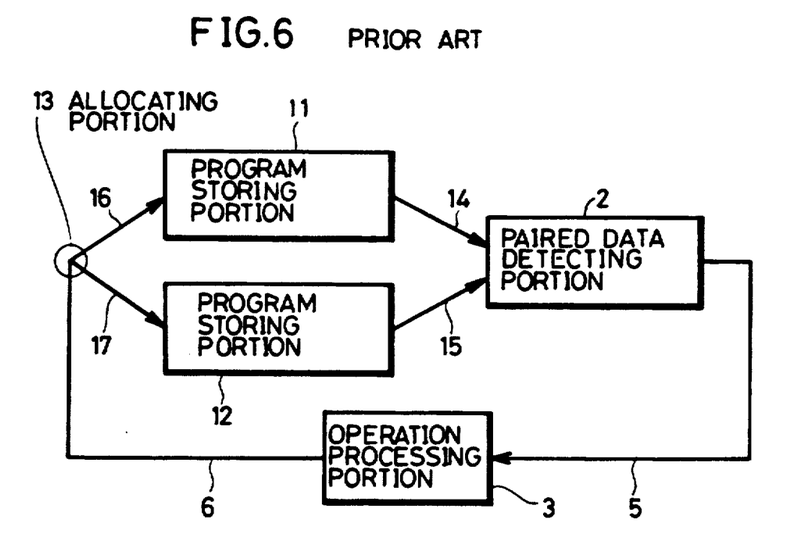
FIG. 6 is a diagram showing another example of the structure of a conventional data flow type information processor.

FIG. 6 is a block diagram showing another example of a structure of the conventional data flow type information processor.

The information processor shown in FIG. 6 is provided with two program storing portions 11 and 12. A data packet outputted from an operation processing portion 3 is inputted to either one of the program storing portions 11 and 12 through an allocating portion 13. The operation processing portion 3 and the allocating portion 13 are coupled to each other by a transmission path 6. The allocating portion 13 is coupled to the program storing portions 11 and 12 through transmission paths 16 and 17, respectively. In addition, the program storing portions 11 and 12 are individually coupled to a paired data detecting portion 2 through transmission paths 14 and 15, respectively. A function of each portion in the information processor shown in FIG. 6 is identical to the function of each portion in the information processor shown in FIG. 1. The allocating portion 13 allocates the data packet outputted from the operation processing portion 3 to either one of the two program storing portions 11 and 12 in order of arrival.

Figure 7:
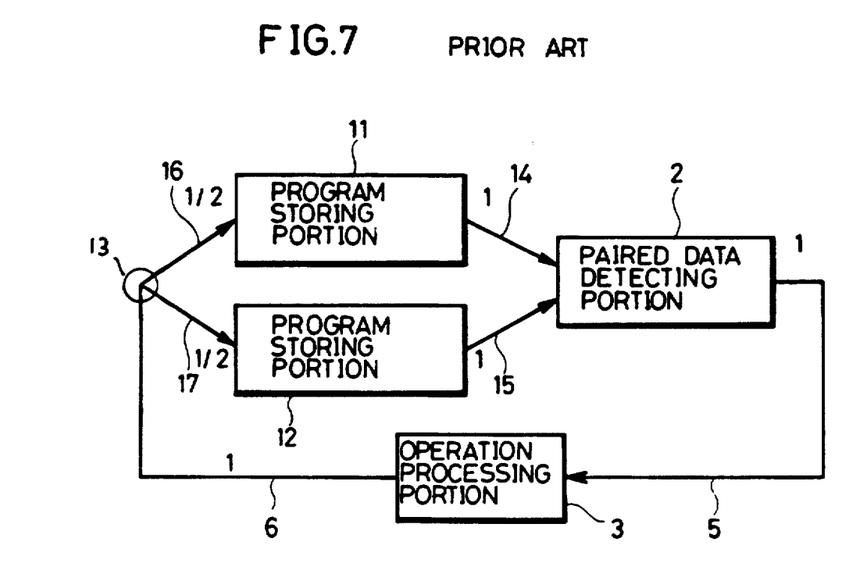
FIG. 7 is a diagram showing the flow rate of a data packet in each transmission path in the information processor shown in FIG. 6.

FIG. 7 shows the flow rate of a data packet in each transmission path, in which it is assumed that flow rates of the data packets in the transmission paths 14 and 15 are 1, respectively. In the information processor shown in FIG. 6, an input of the data packet to the program storing portions 11 and 12 is allocated by the allocating portion 13, so that the data packet is inputted to the program storing portions 11 and 12 at a rate of the maximum performance. When copy processing is performed in the program storing portions 11 and 12, the flow rate of the data packet outputted to the transmission paths 14 and 15 from the program storing portions 11 and 12 is two times the flow rate of the data packet inputted to the program storing portions 11 and 12 through the transmission paths 16 and 17. More specifically, in the transmission paths 14 and 15 for inputting the data packet to the paired data detecting portion 2, the flow rate with the maximum performance can be ensured. In addition, in the transmission path 5 for the data packet outputted from the paired data detecting portion 2, i.e., the transmission path 5 for the data packet inputted to the operation processing portion 3, the flow rate with the maximum performance can be ensured.

Thus, in the conventional information processor shown in FIG. 6, the performance of the operation processing portion 3 is enhanced to a maximum, so that a double effect of parallel processing theoretically takes place, as compared with the conventional information processor shown in FIG. 1.

However, in the information processor shown in FIG. 6, the program storing portion in the information processor shown in FIG. 1 is doubled, so that the entire storage capacity of the program storing portion in the information processor shown in FIG. 6 becomes two times that of the information processor shown in FIG. 1. Therefore, the scale of the information processor is increased.

SUMMARY OF THE INVENTION

An object of the present invention is to provide an information processor in which the performance of an operation processing portion is not degraded at the time of program execution.

Another object of the present invention is to provide an information processor in which the maximum performance can be displayed in an operation processing portion and storage capacity of a program storing portion can be reduced to an essential minimum.

Still another object of the present invention is to provide a data flow type information processor in which the performance of an operation processing portion is not degraded at the time of execution of copy processing.

In order to attain the above described objects, the information processor according to the present invention comprises program storing means, paired data producing means, a plurality of transmission paths and operation processing means.

The program storing means has a single input port and a plurality of output ports, which stores a data flow program comprising a plurality of destination information and a plurality of instruction information. The program storing means reads out the destination information and the instruction information from the data flow program by addressing based on destination information in a destination field in a data packet inputted from the input port, stores the destination information and the instruction information in a destination field and an instruction field in the data packet, respectively, and outputs the data packet through any of the plurality of output ports.

The paired data producing means queues the data packet outputted from the program storing means. The plurality of output ports in the program storing means and the paired data producing means are coupled to each other by the plurality of transmission paths. The paired data producing means detects two data packets having the same destination information out of data packets applied through any of the plurality of transmission path, stores data in a first data field in one of the data packets in a second field in the other data packet, and outputs the other data packet.

The operation processing means receives the data packet outputted from the paired data producing means for performing operation processing with respect to the data packet. The operation processing means decodes instruction information in an instruction field in the data packet, performs predetermined operation processing with respect to the data in the first and second data fields, stores the result of the processing in one of the data fields in the data packet, and outputs the data packet.

In the information processor according to the present invention, since the program storing means has a plurality of output ports and the plurality of output ports are coupled to operation processing means through the plurality of transmission paths, a plurality of data packets outputted from the program storing means are transmitted to the paired data producing means in a pipeline manner. Therefore, the maximum performance can be displayed in the operation processing means without increasing storage capacity of the program storing means.

Thus, the information processor according to the present invention has the same storage capacity as that of the conventional information processor. In addition, in the information processor, the performance of the operation processing means is not degraded at the time of program execution. Therefore, according to the present invention, there can be provided a very useful information processor having improved performance, as compared with the conventional information processor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Referring now to the figures, an embodiment of the present invention will be described in detail.

Figure 8:
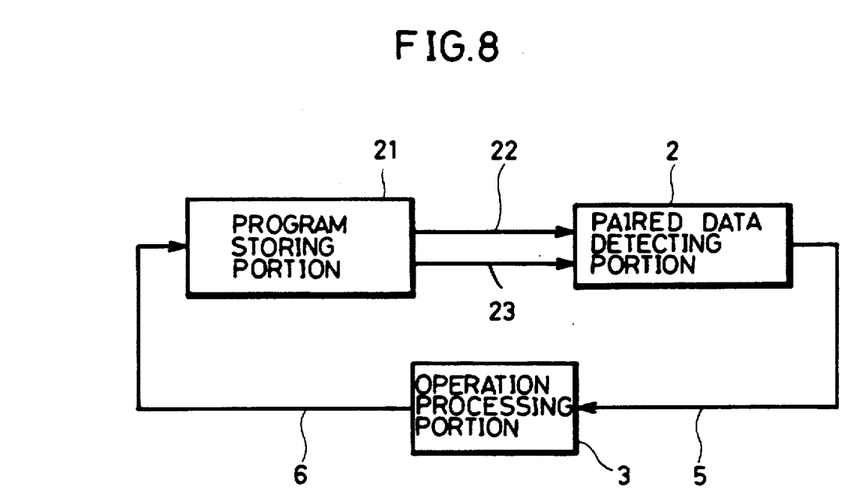
FIG. 8 is a diagram showing a structure of a data flow type information processor according to one embodiment of the present invention.

FIG. 8 is a block diagram showing a structure of a data flow type information processor according to one embodiment of the present invention. The information processor shown in FIG. 8 comprises a program storing portion 21, a paired data detecting portion 2, and an operation processing portion 3. The functions of the paired data detecting portion 2 and the operation processing portion 3 are identical to the functions of the paired data detecting portion 2 and the operation processing portion 3 shown in FIGS. 1 and 6. The program storing portion 21 and the paired data detecting portion 2 are coupled to each other by two transmission paths 22 and 23. In addition, the paired data detecting portion 2 and the operation processing portion 3 are coupled to each other by a transmission path 5, and the operation processing portion 3 and the program storing portion 21 are coupled to each other by a transmission path 6.

Figure 9:
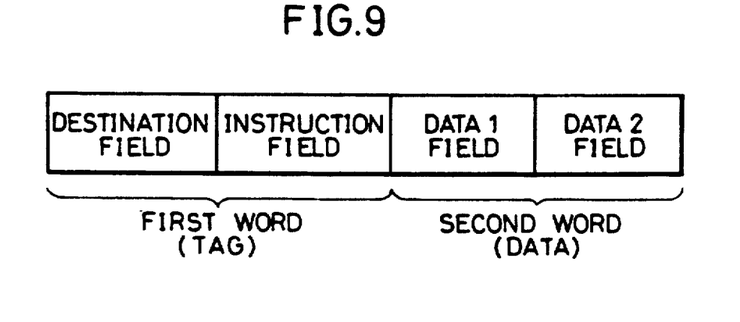
FIG. 9 is a diagram showing a field structure of a data packet processed in the information processor shown in FIG. 8.

FIG. 9 is a diagram showing a field structure of a data packet processed in the information processor shown in FIG. 8. As shown in FIG. 9, the data packet comprises a first word and a second word. The first word comprises a destination field and an instruction field, and the second word comprises a data 1 field and a data 2 field. The first word is referred to as a tag, and the second word is referred to as data.

Description is now made on an operation of the program storing portion in the embodiment shown in FIG. 8.

Figure 10:
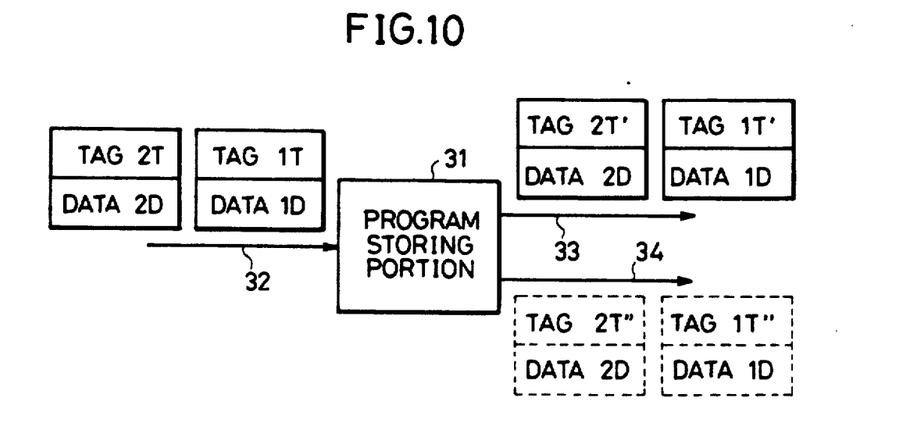
FIG. 10 is a diagram showing a first example of updating of the data packet performed in the information processor shown in FIG. 8.

FIG. 10 is a diagram showing a first example of updating of the data packet performed by the program storing portion. In FIG. 10, a program storing portion 31 corresponds to the program storing portion 21 shown in FIG. 8. In addition, transmission paths 32, 33 and 34 correspond to the transmission paths 6, 22 and 23 shown in FIG. 8, respectively.

The program storing portion 31 stores the data flow program shown in FIG. 3. When a tag 1T in a first data packet is inputted to the program storing portion 31 from the transmission path 32, destination information and instruction information are read out by using the content of the destination field in the tag 1T as an address, so that the information are outputted to the transmission path 33 as a tag 1T' in the first data packet. When data 1D in the first data packet is inputted to the program storing portion 31 subsequently to the tag 1T in the first data packet, the data 1D is outputted to the transmission path 33 without any modification subsequently to the tag 1T'. The tag 1T' and the data 1D constitute a first output data packet.

When the destination information and the instruction information are read out by using the content of the destination field in the tag 1T as an address, copy presence/absence information is also read out. When the copy presence/absence information is copy presence information, the destination information and the instruction information as subsequently stored are read out, so that the information are outputted to the transmission path 34 as a tag 1T". In addition, data 1D is outputted to the transmission path 34 subsequently to the tag 1T". The tag 1T" and the data 1D constitute a copy data packet of the first output data packet, whereby copy processing is achieved.

On the other hand, when the copy presence/absence information is copy absence information, copy processing is performed, so that no output is not provided to the transmission path 34. In the first example of updating of the data packet shown in FIG. 10, the number of data to be copied is a maximum of 1.

Subsequently to the first data packet, the same processing is performed in the program storing portion 31 with respect to a second data packet inputted to the program storing portion 31 from the transmission path 32.

Figure 11:
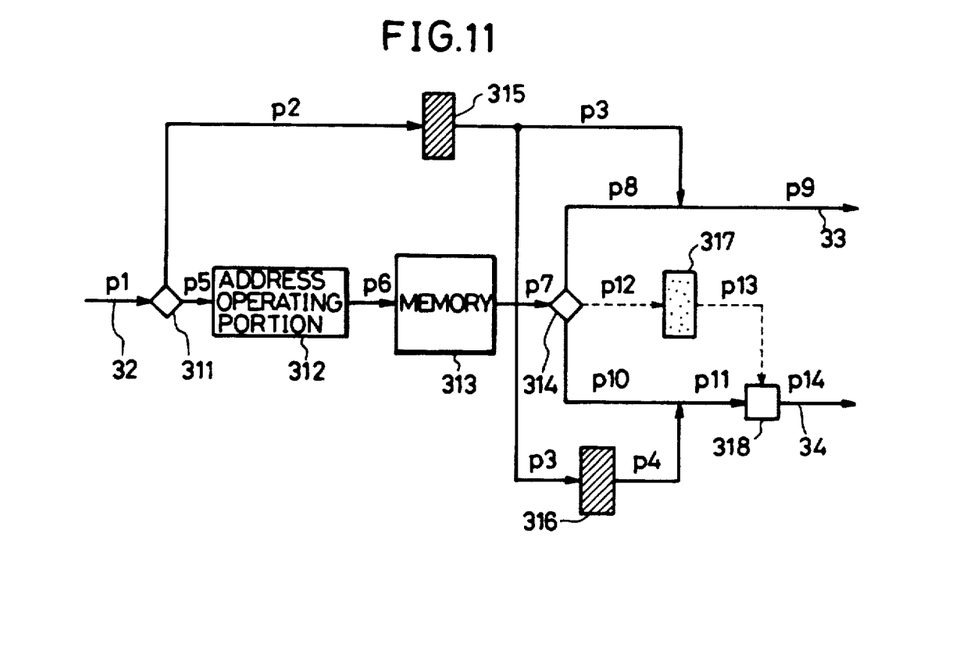
FIG. 11 is a block diagram showing a structure of a program storing portion which updates the data packet shown in FIG. 10.

FIG. 11 is a block diagram showing a structure of the program storing portion 31 shown in FIG. 10.

The program storing portion 31 comprises switches 311, 314 and 318, an address operating portion 312, a memory 313, data latches 315 to 317, and transmission paths p1 to p14. The time when word transfer is made through each of the transmission paths p1 to p14 is t. Transmission path p1, p9 and p14 correspond to the transmission paths 32, 33, and 34 shown in FIG. 10, respectively.

The switch 311 outputs to the transmission path p5 a tag and data in a data packet subsequently inputted from the transmission path p1 without any modification, and outputs to the transmission path p2 only data (the second word) in the inputted data packet. The address operating portion 312 outputs to the transmission path p6 the content of a destination field in the tag as an address. When the tag is inputted from the transmission path p5, while outputting to the transmission path p6 a value obtained by adding 1 to the content of a destination field in a tag proceeding the data as an address when the data is inputted from the transmission path p5. The memory 313 stores the data flow program shown in FIG. 3. The memory 313 outputs to the transmission path p7 the content accessed based on the address inputted from the transmission path p6 after a lapse of the time t. Storage capacity of the memory 313 is the same as that in the conventional information processor shown in FIG. 1.

The content read out from the memory 313 is inputted to the switch 314 through the transmission path p7. When the content inputted from the transmission path p7 corresponds to the tag inputted to the address operating portion 312 from the transmission path p5, the switch 314 outputs to the transmission path p8 only destination information and instruction information in the content read out from the memory 313, and outputs to the transmission path p12 copy presence/absence information. On the other hand, when the content inputted from the transmission path p7 corresponds to the data inputted to the address operating portion 312 from the transmission path p5, the switch 314 outputs to transmission path p10 only the destination information and the instruction information in the content read out from the memory 313 (see the state of word transmission indicated by an arrow represented by a broken line in FIG. 12).

The data latches 315 and 316 hold the contents of the transmission paths p2 and p3 by the time t, respectively.

The data latch 317 holds the content of the transmission path p12 by the time 2t. The switch 318 outputs the content of the transmission path p11 to the transmission path p14 when the content of the transmission path p13 is copy presence information while providing no output when the content of the transmission path p13 is copy absence information. Meanwhile, if the state of each transmission path is not defined as described above, it is assumed that the transmission path is in a high impedance state.

Figure 12:
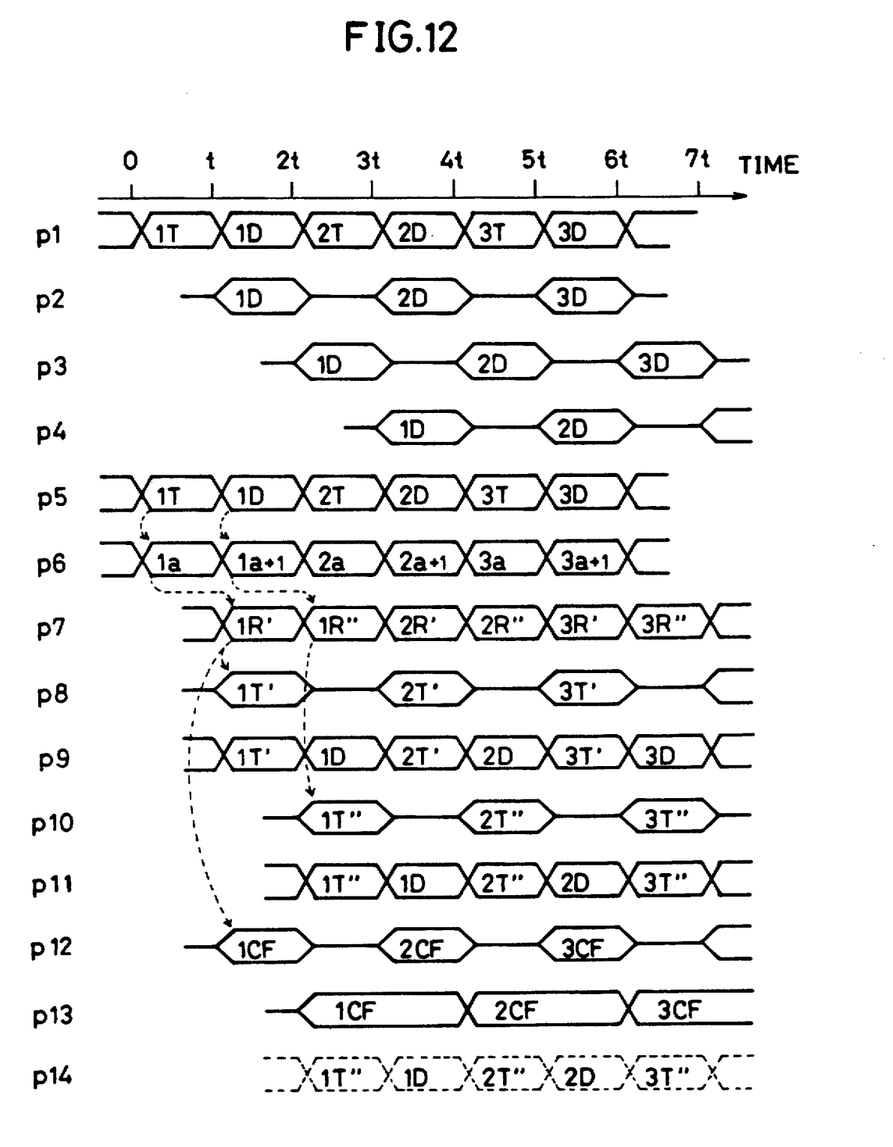
FIG. 12 is a timing chart showing the content of each transmission path in the program storing portion shown in FIG. 11.

FIG. 12 is a timing chart showing a state of each transmission path in FIG. 11.

In FIG. 12, p1 to p14 indicate states of transmission paths corresponding to those in FIG. 11, respectively. 1T and 1D denotes the tag and the data in the a first data packet inputted to the program storing portion 31, respectively. 1a denotes the content (address) of the destination field in the tag 1T, and (1a+1) denotes an address subsequent to address denoted by 1a. 1R' denotes the content of a memory read out using 1a as an address, i.e. destination information, instruction information and copy presence/absence information. Similarly, 1R" denotes the content of a memory read out using (1a+1) as an address. 1T' denotes the destination information and the instruction information in the content 1R' of the memory. Similarly, 1T" denotes the destination information and the instruction information in the content 1R" of the memory. 1CF denotes the copy presence/absence information in the content 1R' of the memory. 2T, 2T, 2a, 2a+1, 2R', 2R" and 2CF correspond to a second data packet inputted to the program storing portion 31, the content thereof being the same as the content in the first data packet. It is the same with a third data packet inputted to the program storing portion 31.

A state is assumed in which at a time 0, a tag 1T in a first data packet reaches the transmission path p1 for input to the program storing portion 31 and thereafter, data 1D, a tag 2T, data 2D, a tag 3T, data 3D, . . . reach the transmission path p1 every time interval t. This state is a state in which the data packet is transferred with the transmission path p1 providing the maximum performance.

The tag 1T which reached the transmission path p1 at the time 0 is outputted to the transmission path p5 by the switch 311 at the time 0, to be inputted to the address operating portion 312. Consequently, at the time 0, an address 1a is outputted to the transmission path p6. At a time t, the content 1R' of the memory 313 accessed based on the address 1a is read out, to be outputted to the transmission path p7. Since the content 1R' of the memory corresponds to the tag 1T, the switch 314 outputs to the transmission path p8 only the destination information and the instruction information (1T') in the content 1R' of the memory and outputs to the transmission path p12 the copy presence/absence information 1CF therein. On the other hand, the data 1D which reached the transmission path p1 at the time t is outputted to the transmission path p2 at the time t by the switch 311, and outputted to the transmission path p5, to be inputted to the address operating portion 312. Consequently, at the t, the address (1a+1) is outputted to the transmission path p6.

At a time 2t, the content 1R" of the memory 313 accessed based on the address (1a+1) is read out, to be outputted to the transmission path p7. Since the content 1R" of the memory corresponds to the data 1D, the switch 314 outputs the transmission path p10 only the destination information and the instruction information (1T") in the content 1R" of the memory. At times 2t and 3t, the data 1D outputted to the transmission path p2 at the time t is transferred to the transmission paths p3 and p4, respectively.

Since the transmission path p9 for output from the program storing portion 31, i.e., the transmission path 33 is obtained by overlapping the transmission path p3 with the transmission path p8, the transmission path p9 outputs the destination information and the instruction information (1T') at the time t while outputting the data 1D at the time 2t. Similarly, the transmission path p11 outputs the destination information and the instruction information (1T") at the time 2t while outputting the data 1D at the time 3t.

Meanwhile, the data latch 317 holds the content of the transmission path p12 at the time 2t until a time 4t. The transmission path p14 for output from the program storing portion 31, i.e., the transmission path 34 is switched by the switch 318. More specifically, when the content of the transmission path p13 is copy presence information, the content of the transmission path p14 is equal to the content of the transmission path p11. On the other hand, when the content of the transmission path p13 is copy absence information, the transmission path p14 enters a high impedance state.

The forgoing is processing performed when the first data packet is inputted to the program storing portion 31.

The same processing as that with respect to the first data packet is performed in a pipeline manner with respect to the second data packet and the subsequent data packet inputted subsequently to the first data packet. It is found from the timing chart of the transmission paths p9 and p14 that the two transmission paths p9 and p14 for output from the program storing portion 31 can ensure a flow rate with the maximum performance when the transmission path p1 for input to the program storing portion 31 is operated with the maximum performance. More specifically, the performance of the operation processing portion 3 is enhanced to a maximum. Thus, in the example of updating of the data packet shown in FIG. 10, a double effect of parallel processing is obtained, as compared with the information processor shown in FIG. 1, by using a memory having the same capacity as that of the conventional information processor shown in FIG. 1.

Figure 13:
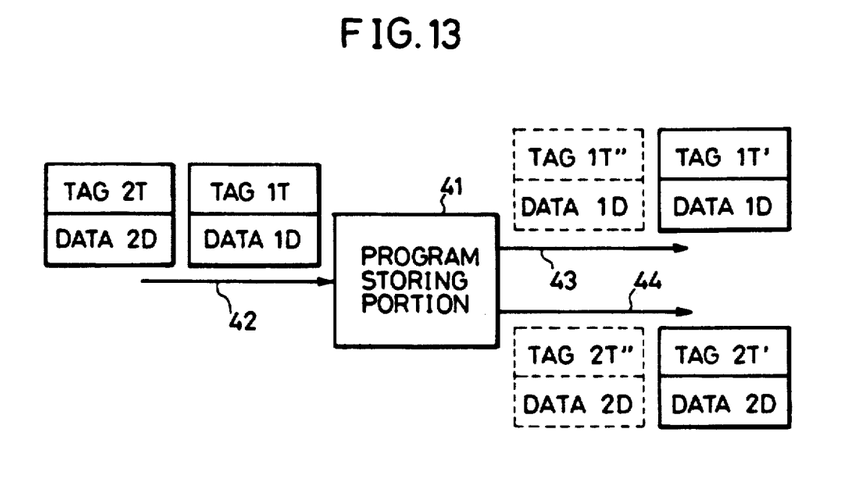
FIG. 13 is a diagram showing a second example of updating of the data packet performed in the information processor shown in FIG. 8.

FIG. 13 is a diagram showing a second example of updating of the data packet performed by the program storing portion.

In FIG. 13, a program storing portion 41 corresponds to the program storing portion 21 shown in FIG. 8. In addition, transmission paths 42, 43 and 44 correspond to the transmission paths 6, 22 and 23 shown in FIG. 8, respectively.

The program storing portion 41 stores the data flow program shown in FIG. 3. When a tag 1T in a first data packet is inputted to the program storing portion 41 from the transmission path 42, destination information and instruction information are read out by using the content of a destination field in the tag 1T as an address, so that the information are outputted to the transmission path 43 as a tag 1T' in the first data packet. When data 1D in the first data packet is inputted to the program storing portion 41 from the transmission path 42 subsequently to the tag 1T in the first data packet, the data 1D is outputted to the transmission path 43 without any modification, subsequently to the tag 1T'. The tag 1T' and the data 1D constitute a first output data packet.

When the destination information and the instruction information are read out by using the content of the destination field in the tag 1T as an address, copy presence/absence information is also read out. When the copy presence/absence information is copy presence information, destination information and instruction information as subsequently stored are read out, so that the information are outputted to the transmission path 43 as a tag 1T", subsequently to the data 1D. In addition, data 1D is outputted to the transmission path 43, subsequently to the tag 1T". The tag 1T" and the data 1D constitute a copy data packet of the first output data packet. Therefore, copy processing is achieved.

On the other hand, when the copy presence/absence information is copy absence information, copy processing is not performed, so that only the tag 1T' and the data 1D are outputted to the transmission path 43. In the second example of updating of the data packet shown in FIG. 13, the number of data as copied is a maximum of 1.

The same processing is performed in the program storing portion 41 with respect to a second data packet inputted to the program storing portion 41 from the transmission path 42 subsequently to the first data packet except that as a transmission path for output, the transmission path 43 is replaced with a transmission path 44. In the following, the transmission path 43 is employed as a transmission path for output in the case of a third data packet, a fifth data packet, . . . , and the transmission path 44 is employed as a transmission path for output in the case of a fourth data packet, a sixth data packet, . . .

Figure 14:
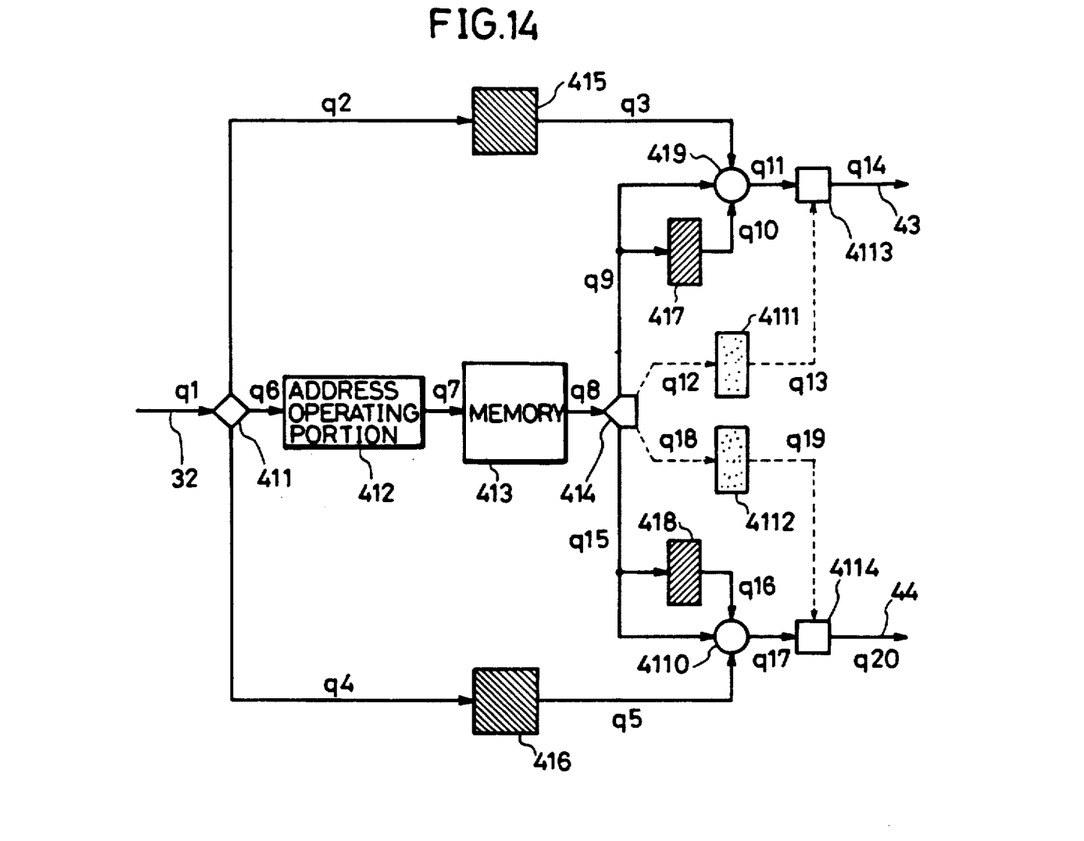
FIG. 14 is a block diagram showing a structure of a program storing portion which updates the data packet shown in FIG. 13.

FIG. 14 is a block diagram showing a structure of the program storing portion 41.

The program storing portion 41 comprises switches 411, 414, 419, 4110, 4113 and 4114, an address operating portion 412, a memory 413, data latches 415 to 418, 4111 and 4112, and transmission paths q1 to q20. The time when word transfer is made through each of the transmission paths q1 to q20 is t. The transmission paths q1, q14 and q20 correspond to the transmission path 42, 43 and 44 shown in FIG. 13, respectively.

The switch 411 outputs to the transmission path q6 a tag and data in a data packet subsequently inputted from the transmission path q1 without any modification, and alternately outputs to the transmission paths q2 and q4 only the data (the second word) in the inputted data packet. When the tag is inputted from the transmission path q6, the address operating portion 412 outputs to the transmission path q7 the content of the destination field in the tag as an address. On the other hand, when the data is inputted from the transmission path q6, the address operating portion 412 outputs to the transmission path q7 as an address a value obtained by adding 1 to the content of the destination field in the tag preceeding the data.

The memory 413 stores the data flow program shown in FIG. 3. The memory 413 outputs to the transmission path q8 the content accessed based on an address inputted from the transmission path q7 after a lapse of the time t. Storage capacity of the memory 413 is the same as that of the conventional information processor shown in FIG. 1.

The content read out from the memory 413 is inputted to the switch 414 through the transmission path q8. When the content inputted from the transmission path q8 corresponds to a tag in an odd-numbered data packet which is inputted to the address operating portion 412 from the transmission path q6, the switch 414 outputs to the transmission path q9 only the destination information and the instruction information in the content read out from the memory 413, and outputs to the transmission path q12 the copy presence/absence information. On the other hand, when the content inputted from the transmission path q8 corresponds to data in the odd-numbered data packet which is inputted to the address operating portion 412 from the transmission path q6, the switch 414 outputs to the transmission path q9 only the destination information and the instruction information in the content read out from the memory 413. In addition, when the content inputted from the transmission path q8 corresponds to a tag in an even-numbered data packet, the switch 414 outputs to the transmission path q15 only the destination information and the instruction information in the content read out from the memory 413, and outputs to the transmission path q18 the copy presence/absence information. Furthermore, when the content inputted from the transmission path q8 corresponds to data in the even-numbered data packet, the switch 414 outputs to the transmission path q15 only the destination information and the instruction information in the content read out from the memory 313.

The data latches 415 and 416 hold the contents of the transmission paths q2 and q4 by the time 4t, respectively. The data latches 417 and 418 hold the contents of the transmission paths q9 and q15 by the time t, respectively. After the transmission path q9 is selected by the switch 414, the switch 419 outputs to the transmission path q11 the content of the transmission path q9 during the time t, the content of the transmission path q3 during the next time t, the content of the transmission path q10 during the further next time t, and the content of the transmission path q3 during the still further next time t.

The switch 4110 has the same function as that of the switch 419. The transmission paths q15, q16, q5 and q17 correspond to the transmission paths q9, q10, q3 and q11 coupled to the switch 419, respectively.

The data latch 4111 delays the copy presence/absence information on the transmission path q12 by the time 2t, to hold the same during the time 2t. The data latch 4112 delays the copy presence/absence information on the transmission path q18 by the time 2t, to hold the same during the time 2t. The switch 4113 outputs to the transmission path q14 the content of the transmission path q11 when the content of the transmission path q13 is copy presence information while providing no output when the content of the transmission path q13 is copy absence information or the transmission path q13 is in a high impedance state. The switch 4114 outputs to the transmission path q20 the content of the transmission path q17 when the content of the transmission path q19 is copy presence information while providing no output when the content of the transmission path q19 is copy absence information or the transmission path q19 is in the high impedance state. Meanwhile, if the state of each transmission path is not defined as described above, it is assumed that the transmission path is in the high impedance state.

Figure 15:
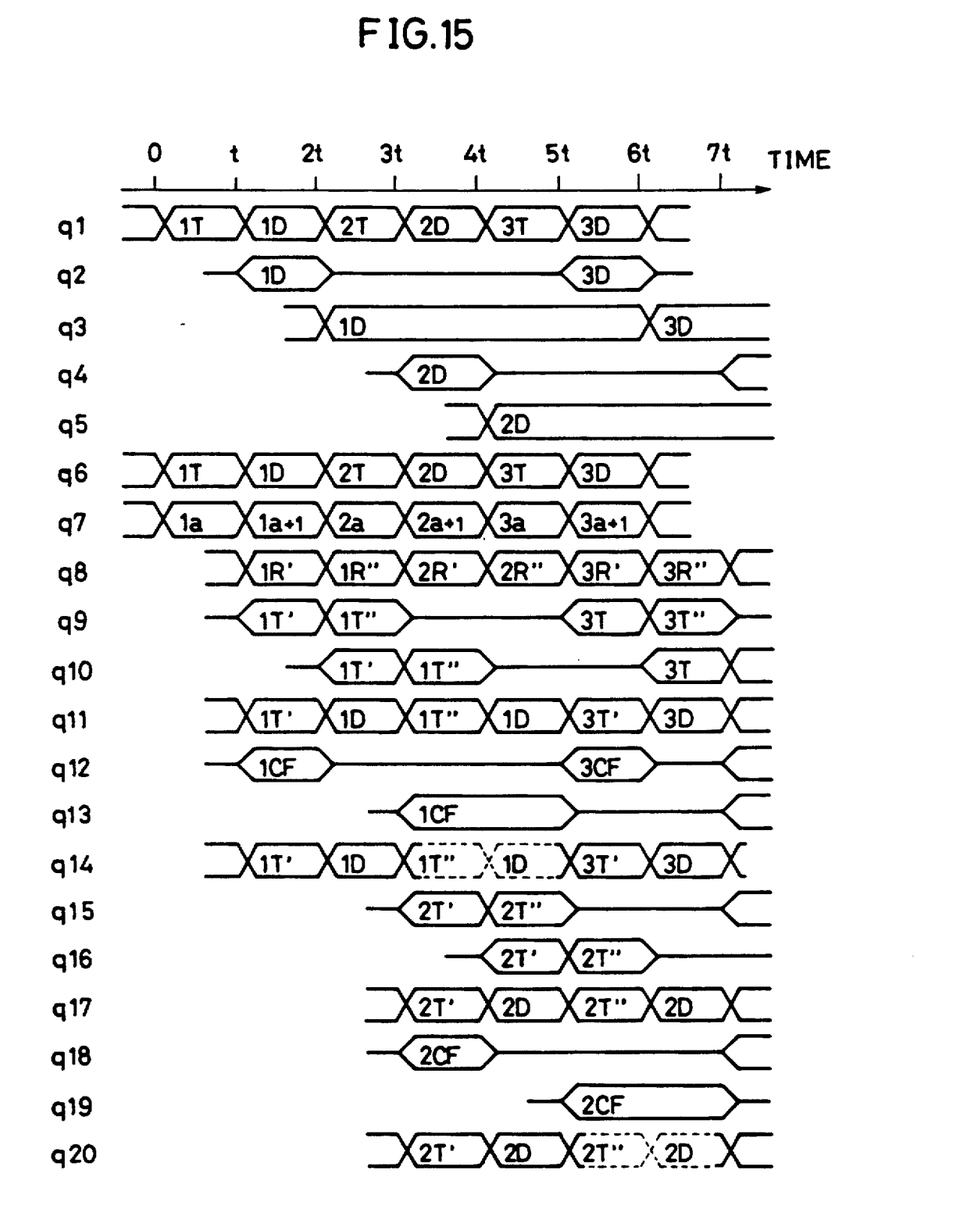
FIG. 15 is a timing chart showing the content of each transmission path in the program storing portion shown in FIG. 14.

FIG. 15 is a timing chart showing a state of each transmission path in FIG. 14.

In FIG. 15, q1 to q20 indicate the states of transmission paths corresponding to those in FIG. 14, respectively. Symbols such as 1T and 1D are identical to the symbols shown in FIG. 12.

As in the case of the first example of updating of the data packet shown in FIG. 12, a state is assumed in which at a time 0, a tag 1T in a first data packet reaches the transmission path q1 for input to the program storing portion 41, i.e., the transmission path 32 and thereafter, data 1D, a tag 2T, data 2D, a tag 3T, data 3D, ... reach the transmission path q1 every time interval t. This state is a state in which the data packet is transferred with the transmission path q1 having the maximum performance.

The tag 1T which reached the transmission path q1 at the time 0 is outputted to the transmission path q6 by the switch 411 at the time 0, to be inputted to the address operating portion 412. Consequently, at the time 0, an address 1a is outputted to the transmission path q7. At a time t, the content 1R' of the memory 413 accessed based on the address 1a is read out, to be outputted to the transmission path q8. Since the content 1R' of the memory corresponds to the tag 1T in an odd-numbered data packet, the switch 414 outputs to the transmission path q9 only the destination information and the instruction information (1T') in the content 1R' of the memory, and outputs to the transmission path q12 the copy presence/absence information 1CF. The content of the transmission path q12 is transferred to the transmission path q13 by the data latch 4111 at a time 3t, to be held during the time 2t.

On the other hand, the data 1D which reached the transmission path q1 at the time t is outputted to the transmission path q6 by the switch 411 at the time t, to be inputted to the address operating portion 412. Consequently, at the time t, an address (1a + 1) is outputted to the transmission path q7.

At a time 2t, the content 1R" of the memory 413 accessed based on the address (1a + 1) is read out, to be outputted to the transmission path q8. Since the content 1R" of the memory corresponds to the data 1D in the odd-numbered data packet, only the destination information and the instruction information (1T") in the content 1R" of the memory are outputted to the transmission path q9 by the switch 414. The content of the transmission path q9 is transmitted to the transmission path q10 by the data latch 417.

The data 1D outputted to the transmission path q2 at the time t is transmitted to the transmission path q3 by the data latch 415 at the time 2t, to be held until a time 6t. The switch 419 is switched to the transmission path q9, the transmission path q3, the transmission path q10, the transmission path q3, ... every time interval t, so that the content of the transmission path q11 is changed to a tag 1T', data 1D', a tag 1T" and data 1D. The content of the transmission path q14 for output from the program storing portion 41, i.e., the transmission path 43 is switched by the switch 4113. Therefore, when the content of the transmission path p13 is copy presence information, the content of the transmission path q14 is equal to the content of the transmission path q11. On the other hand, when the content of the transmission path q13 is copy absence information or the transmission path q13 is in a high impedance state, the transmission path q14 enters the high impedance state.

The forgoing is processing with respect to the first data packet inputted to the program storing portion 41, in the second example of updating of the data packet shown in FIG. 13.

The same processing as that with respect of the first data packet is performed in a pipeline manner with respect to an odd-numbered data packet which is inputted subsequently to the first data packet. In addition, processing with respect to the first data packet and processing symmetrical therewith in FIG. 14 are performed in a pipeline manner with respect to an even-numbered data packet, so that a data packet is outputted to the transmission path q20.

When the transmission path q1 for input to the program storing portion 41 is operated with the maximum performance, it is found from the timing charts of the transmission paths q14 and q20 that the two transmission paths q14 and q20 for output from the program storing portion 41 can ensure a flow rate with the maximum performance. Therefore, the performance of the operation processing portion 3 is enhanced to a maximum.

As described in the forgoing, in the second example of updating of the data packet performed based on the program 41 shown in FIG. 13, a double effect of parallel processing can be obtained, as compared with the information processor shown in FIG. 1 by using a memory having the same capacity as that of the conventional information processor shown in FIG. 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processor for processing data packets each comprising a destination field for storing destination information, an instruction field for storing instruction information, and first and second data fields for storing data in accordance with a data flow program, comprising:

program storing means, having one input port and a plurality of output ports, for storing a data flow program including a plurality of destination information and a plurality of instruction information corresponding thereto, said program storing means reading out said stored destination information and said stored instruction information of said data flow program by addressing based on destination information in a destination field of a data packet inputted from said input port, storing said read-out destination information and said read-out instruction information in said destination field and an instruction field of said data packet, respectively, and outputting said data packet through any of said plurality of output ports, said program storing means comprising memory means for storing said data flow program, address selecting means for reading out said stored destination information and said stored instruction information from said memory means by addressing based on said destination information in said destination field of said data packet inputted from said input port, and data packet outputting means for storing said read-out destination information and said read-out instruction information from said memory means in said destination field and said instruction field of said data packet inputted from said input port, respectively, and outputting said data packet;

paired data producing means for queuing said data packet outputted from said program storing means;

a plurality of transmission paths coupling said plurality of output ports of said program storing means with said paired data producing means, said paired data producing means detecting two data packets, output from said program storing means, having the same destination information, storing data of a first data field of one of said detected data packets in a second data field of the other detected data packet, and outputting said other detected data packet;

operating means, receiving said other detected data packet outputted from said paired data producing means, for performing operation processing with respect to said other detected data packet, said operating means decoding instruction information of an instruction field of said other detected data packet, performing predetermined operation processing with respect to data in the first and second data fields, storing the result of the processing in one of said data fields in said other detected data packet, and outputting said other detected data packet as said data packet inputted to said program storing means through said input port, said data flow program further comprising processing information indicative of desired predetermined processing, including copy processing, said copy processing including copy commanding information for commanding said copy processing, said address selecting means further reads out said processing information from said memory means by said addressing, said program storing means further comprising processing means for performing processing based on said processing information read out from said memory means and for outputting information obtained by said performed processing, said data packet outputting means further producing a new data packet including said information outputted from said processing means and outputting said new data packet to any of said plurality of output ports, said processing means including copy processing means responsive to said copy commanding information for outputting as said information the same data as said data in said first data field in said data packet inputted from said input port, said data packet outputting means outputting to any of said plurality of output ports as an original data packet, said data packet storing said read-out destination information and said read-out instruction information from said memory means, and outputting to any of said plurality of output ports as a copy data packet a new data packet including the data outputted from said copy processing means, and said data packet outputting means outputs to one of said plurality of output ports odd-numbered original data packets and said copy data packet corresponding thereto, and outputs to another one of said plurality of output ports even-numbered original data packets and said copy data packet corresponding thereto.

2. The information processor according to claim 1, said address selecting means further reads out a next destination information and a next instruction information corresponding thereto, from said memory means after said addressing, by addressing, subsequent to said addressing, and said copy processing means stores said next destination information and said next instruction information read out from said memory means in a destination field and an instruction field in said copy data packet, respectively.

3. The information processor according to claim 2, said copy processing comprising first holding means, receiving data of first data fields in said odd-numbered data packets from said input port, for holding the same during a constant time period, and second holding means, receiving data of first data fields in said even-numbered data packets from said input port, for holding the same during a constant time period, and said data packet outputting means comprising switching means sequentially outputting said destination information and said instruction information corresponding to said odd-numbered data packets which are read out from said memory means and said data held in said first holding means to one of said plurality of output ports and then, sequentially outputting to said one of said plurality of output ports said next destination information and said next instruction information read out from said memory means and said data held in said first holding means in response to said copy commanding information, and sequentially outputting said destination information and said instruction information corresponding to said even-numbered data packets which are read out from said memory means and said data held in said second holding means to another one of said plurality of output ports and then, outputting to another one of said plurality of output ports said next destination information and said next instruction information read out from said memory means and said data held in said second holding means in response to copy commanding information.

4. An information processor for processing data packets each comprising a destination field for storing destination information, an instruction field for storing instruction information, and first and second data fields for storing data in accordance with a data flow program, comprising:

program storing means, having one input port and a plurality of output ports, for storing a data flow program including a plurality of destination information and a plurality of instruction information corresponding thereto, said program storing means reading out said stored destination information and said stored instruction information of said data flow program by addressing based on destination information in a destination field of a data packet inputted from said input port, storing said read-out destination information and said read-out instruction information in said destination field and an instruction field of said data packet, respectively, and outputting said data packet through any of said plurality of output ports, said program storing means comprising memory means for storing said data flow program, address selecting means for reading out said stored destination information and said stored instruction information from said memory means by addressing based on said destination information in said destination field of said data packet inputted from said input port, and data packet outputting means for storing said read-out destination information and said read-out instruction information from said memory means in said destination field and said instruction field of said data packet inputted from said input port, respectively, and outputting said data packet;

paired data producing means for queuing said data packet outputted from said program storing means;

a plurality of transmission paths coupling said plurality of output ports of said program storing means with said paired data producing means, said paired data producing means detecting two data packets, output from said program storing means, having the same destination information, storing data of a first data field of one of said detected data packets in a second data field of the other detected data packet, and outputting said other detected data packet;

operating means, receiving said other detected data packet outputted from said paired data producing means, for performing operation processing with respect to said other detected data packet, said operating means decoding instruction information of an instruction field of said other detected data packet, performing predetermined operation processing with respect to data in the first and second data fields, storing the result of the processing in one of said data fields in said other detected data packet, and outputting said other detected data packet as said data packet inputted to said program storing means through said input port, said data flow program further comprising processing information indicative of desired predetermined processing, including copy processing, said processing information including copy commanding information for commanding said copy processing, said address selecting means further reads out said processing information from said memory means by said addressing, said program storing means further comprising processing means for performing processing based on said processing information read out from said memory means and for outputting information obtained by said performed processing, said processing means including copy processing means responsive to said copy commanding information for outputting as said information the same data as said data in said first data field in said data packet inputted from said input port, said address selecting means further reads out a next destination information and a next instruction information corresponding thereto, from said memory means after said addressing, by addressing, subsequent to said addressing, said copy processing means stores said next destination information and said next instruction information read out from said memory means in a destination field and an instruction field in said copy data packet, and said data packet outputting means outputs to one of said plurality of output ports as an original data packet, said data packet storing said read-out destination information and said read-out instruction information from said memory means, and outputs to another one of said plurality of output ports as a copy data packet, a new data packet, including the data outputted from said copy processing means.

5. The information processor according to claim 4, said copy processing means comprising holding means receiving said data in said first data field in said data packet inputted from said input port for holding the same during a constant time period, said data packet outputting means comprising switching means sequentially outputting said destination information and said instruction information read out from said memory means and the data held in said holding means to one of said plurality of output ports and then, outputting said next destination information and said next instruction information read out from said memory means and said data held in said holding means to another one of said plurality of output ports in response to said copy commanding information.

* * * * *